United States Patent
Masuko

(10) Patent No.: US 9,690,778 B2
(45) Date of Patent: Jun. 27, 2017

(54) INFORMATION PROCESSING SYSTEM, CONTROL METHOD FOR INFORMATION PROCESSING SYSTEM, INFORMATION PROCESSING DEVICE, CONTROL METHOD FOR INFORMATION PROCESSING DEVICE, INFORMATION STORAGE MEDIUM, AND PROGRAM

(71) Applicant: Rakuten, Inc., Tokyo (JP)

(72) Inventor: Soh Masuko, Tokyo (JP)

(73) Assignee: RAKUTEN, INC., Tokyo (JP)

(*) Notice: Subject to any disclaimer, the term of this patent is extended or adjusted under 35 U.S.C. 154(b) by 0 days.

(21) Appl. No.: 14/781,032

(22) PCT Filed: Mar. 29, 2013

(86) PCT No.: PCT/JP2013/059765
§ 371 (c)(1),
(2) Date: Sep. 29, 2015

(87) PCT Pub. No.: WO2014/155742
PCT Pub. Date: Oct. 2, 2014

(65) Prior Publication Data
US 2016/0299890 A1 Oct. 13, 2016

(51) Int. Cl.
*G06F 17/20* (2006.01)
*G06F 17/28* (2006.01)
(Continued)

(52) U.S. Cl.
CPC ........ *G06F 17/2863* (2013.01); *G06F 17/289* (2013.01); *G06K 9/00979* (2013.01);
(Continued)

(58) Field of Classification Search
None
See application file for complete search history.

(56) References Cited

U.S. PATENT DOCUMENTS 5,222,160 A * 6/1993 Sakai .................... G06F 17/273
345/467
7,778,632 B2 * 8/2010 Kurlander ......... H04M 1/72566
348/61
(Continued)

FOREIGN PATENT DOCUMENTS

JP S61-228571 A 10/1986
JP 2001-216303 A 8/2001
(Continued)

OTHER PUBLICATIONS

English Translation of International Search Report for PCT/JP2013/059765 dated May 7, 2013.
(Continued)

*Primary Examiner* — Edgar Guerra-Erazo
(74) *Attorney, Agent, or Firm* — Hubbs, Enatsky & Inoue PLLC

(57) ABSTRACT

An information processing system is configured to: acquire a plurality of converted character strings one by one, each of the plurality of converted character strings having been converted from a corresponding one of a plurality of original character strings included in an original image; generate, each time a converted character string is acquired, a converted image representing the converted character string for the original image corresponding to the acquired converted character string; and change a content of a foreground of an arrangement area of the original image in an object to be displayed on a screen to the converted image.

10 Claims, 17 Drawing Sheets

(51) Int. Cl.
  *G11B 27/031*  (2006.01)
  *G06K 9/62*  (2006.01)
  *G06K 9/00*  (2006.01)
  *G06K 9/32*  (2006.01)

(52) U.S. Cl.
  CPC ......... *G06K 9/3266* (2013.01); *G06K 9/6217* (2013.01); *G11B 27/031* (2013.01); *G06K 2209/011* (2013.01)

(56) References Cited

U.S. PATENT DOCUMENTS

| | | | | |
|---|---|---|---|---|
| 7,865,358 | B2* | 1/2011 | Green | G06F 17/2785 704/10 |
| 8,280,717 | B2* | 10/2012 | Tanaka | G06F 3/1208 704/10 |
| 8,682,642 | B2* | 3/2014 | Onishi | G06F 17/289 704/2 |
| 8,855,413 | B2* | 10/2014 | Tang | G06K 9/00 382/165 |
| 2006/0206305 | A1* | 9/2006 | Kimura | G06F 17/2827 704/2 |
| 2006/0210198 | A1* | 9/2006 | Suenaga | G06K 9/00993 382/321 |
| 2007/0099602 | A1* | 5/2007 | Kurlander | H04M 1/72566 455/418 |
| 2008/0233980 | A1* | 9/2008 | Englund | G06F 17/289 455/466 |
| 2012/0116750 | A1* | 5/2012 | Onishi | G06F 17/289 704/3 |
| 2012/0288190 | A1* | 11/2012 | Tang | G06K 9/00 382/165 |
| 2014/0056525 | A1 | 2/2014 | Masuko | |
| 2014/0310585 | A1 | 10/2014 | Masuko | |
| 2015/0128015 | A1 | 5/2015 | Masuko | |

FOREIGN PATENT DOCUMENTS

| | | |
|---|---|---|
| JP | 2002-108855 A | 4/2002 |
| JP | 2012-234287 A | 11/2012 |
| WO | 2012147936 A1 | 11/2012 |

OTHER PUBLICATIONS

The partial translation of OA for corresponding Patent Application No. JP2015-505745 dated Apr. 7, 2015.

* cited by examiner

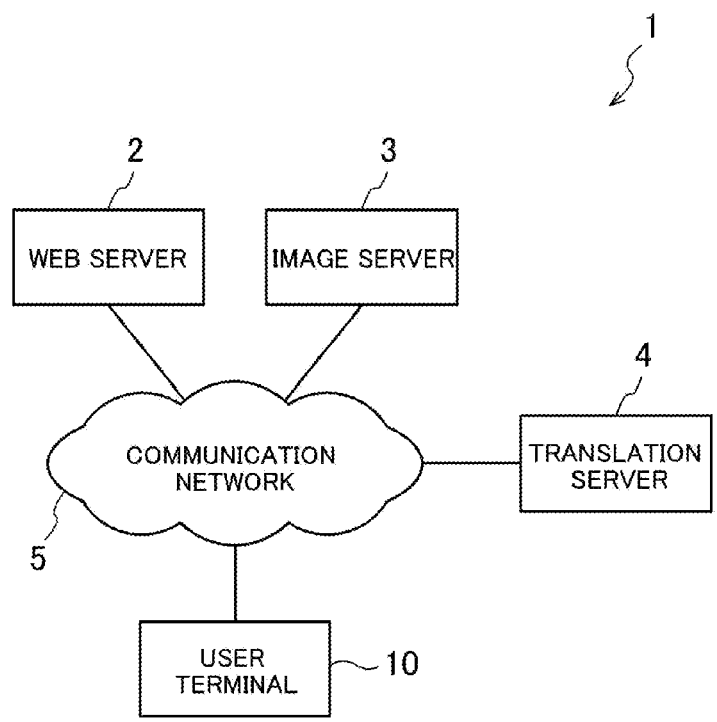
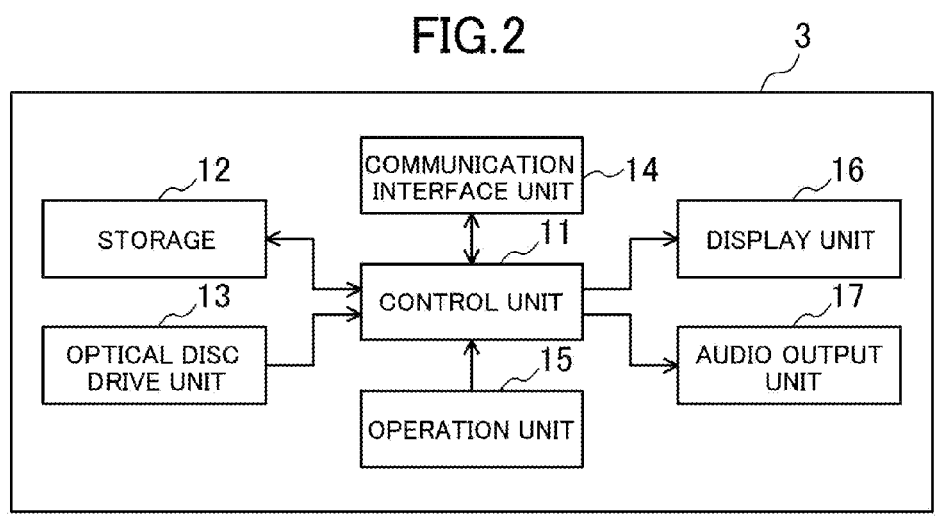

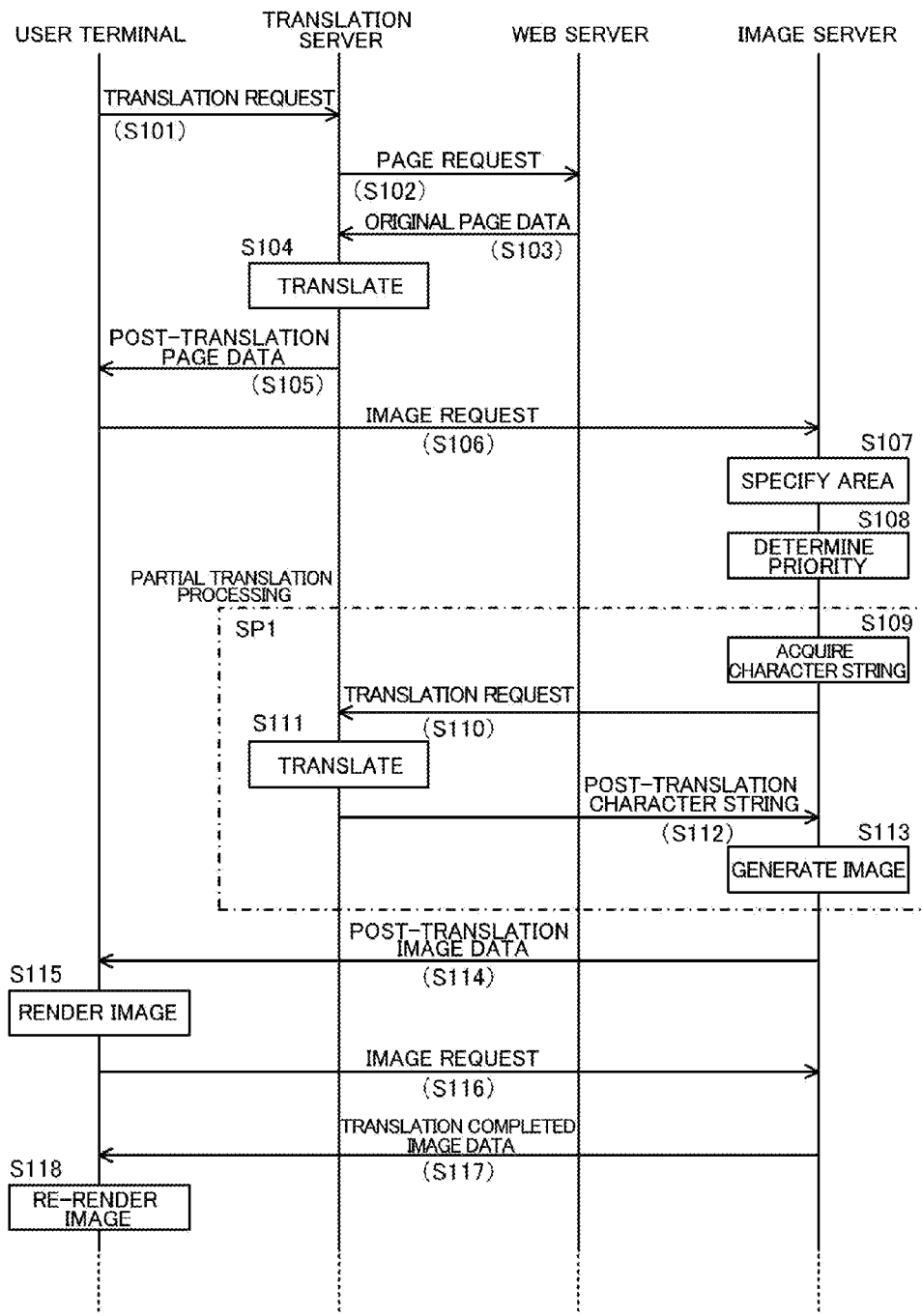

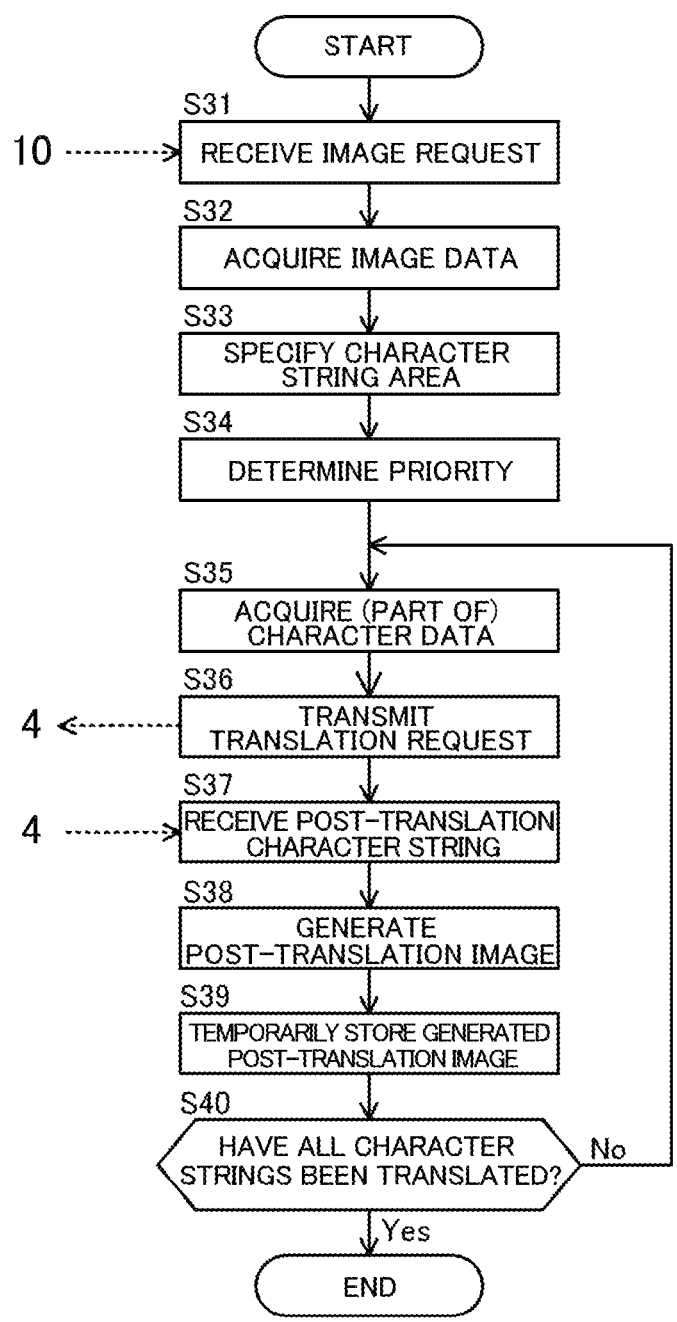

FIG.8
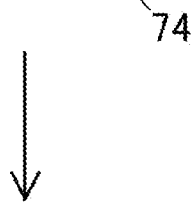
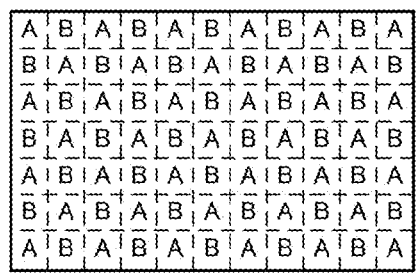

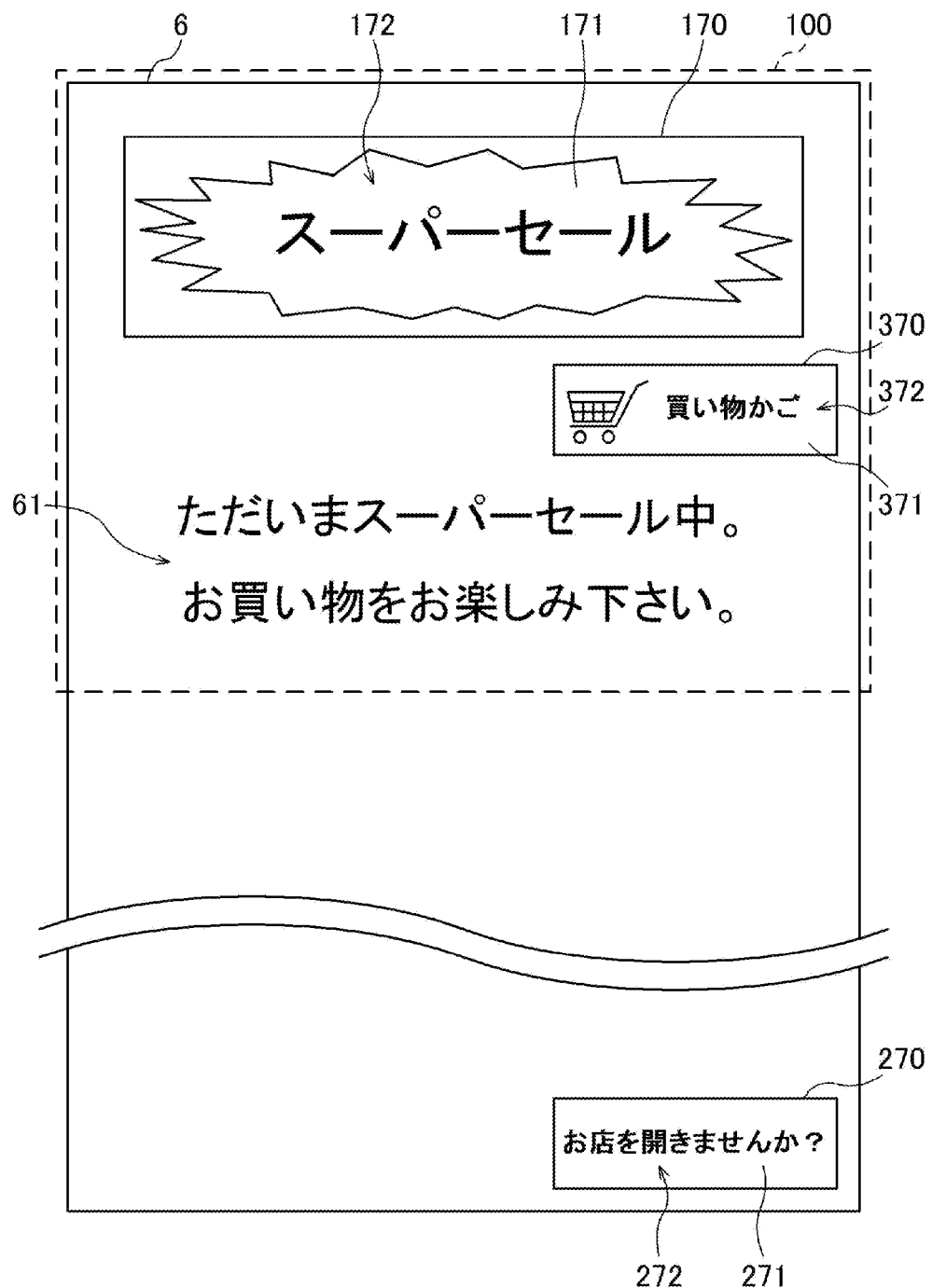

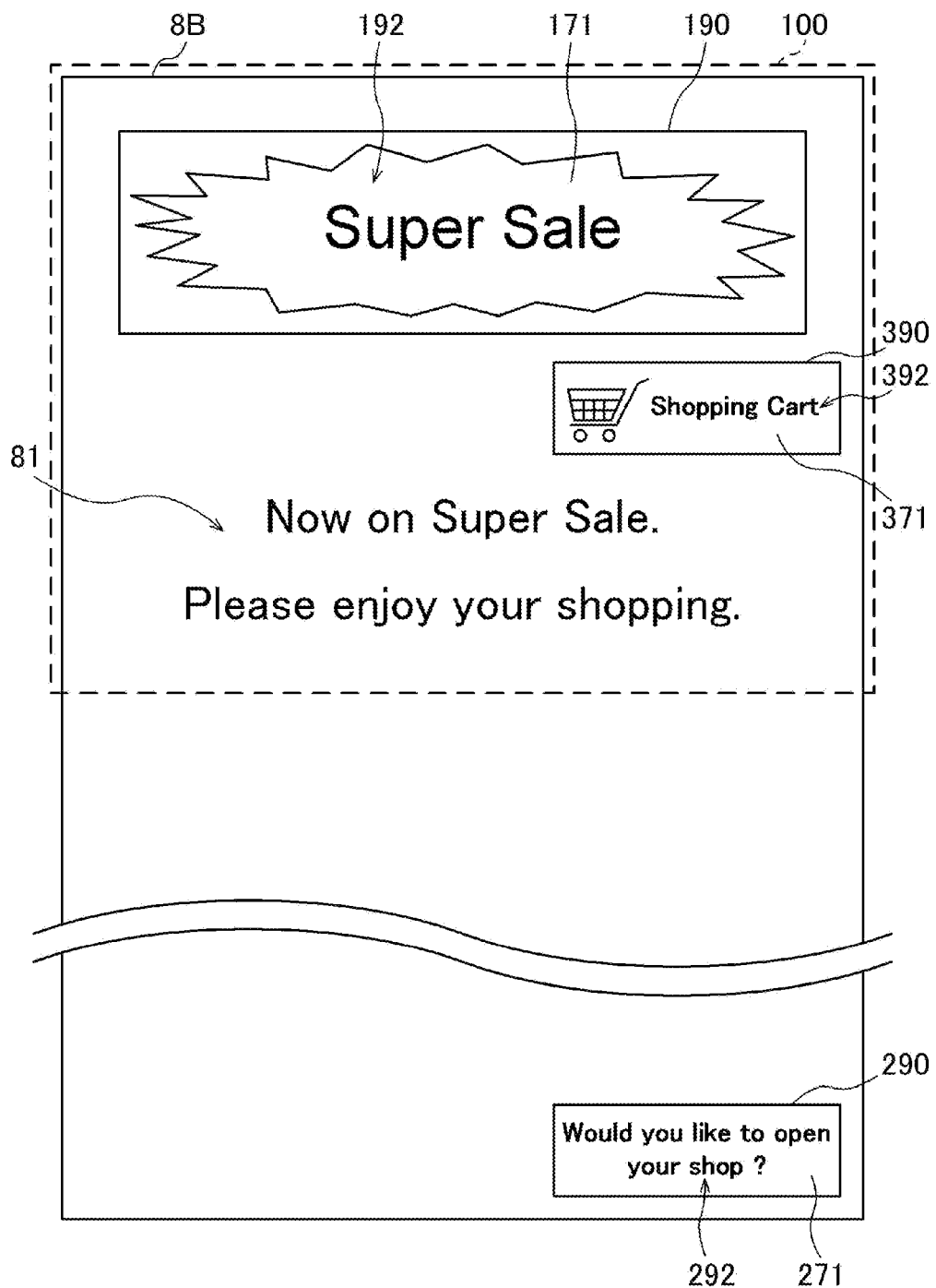

INFORMATION PROCESSING SYSTEM, CONTROL METHOD FOR INFORMATION PROCESSING SYSTEM, INFORMATION PROCESSING DEVICE, CONTROL METHOD FOR INFORMATION PROCESSING DEVICE, INFORMATION STORAGE MEDIUM, AND PROGRAM

CROSS REFERENCE TO RELATED APPLICATIONS

This application is a National Stage of International Application No. PCT/JP2013/059765 filed on Mar. 29, 2013. The contents the above document is incorporated herein by reference in its entirety.

TECHNICAL FIELD

The present invention relates to an information processing system, a method of controlling the information processing system, an information processing device, a method of controlling the information processing device, an information storage medium, and a program.

BACKGROUND ART

In the field of image processing, there are cases when there is a need to read a character string from an original image including a character string and a background image, convert the character string by translation and the like, and generate a new image including the converted character string and the background image.

For example, in a virtual shopping mall site, an image including a character string, such as "FINAL DAY" used during bargain sales and the like, and a background image, such as a graphic for issuing an alert, may be used. It is convenient to have a function for reading the character string from the image, translating the read character string into another language, and generating an image including the translated character string and the background image.

In Patent Literature 1, there is disclosed a server configured to receive an image request from a terminal, and transmit as an image response an image including a character or a character string designated by added information specified by an image parameter designated in the received image request.

CITATION LIST

Patent Literature

[Patent Literature 1] WO 2012/147936 A1

SUMMARY OF INVENTION

Technical Problem

However, with the technology disclosed in Patent Literature 1, the processing load on the server tends to increase in cases such as when there are a plurality of character strings added to an image or when there are a plurality of images including a character string.

The present invention has been made in view of the problem described above. It is an object of this invention to provide an information processing system capable of avoiding the concentration of processing, a method of controlling the information processing system, an information processing device, a method of controlling the information processing device, an information storage medium, and a program.

Solution to Problem

In order to solve the above-mentioned problem, an information processing system according to one embodiment of the present invention includes: acquisition means for acquiring a plurality of converted character strings one by one, each of the plurality of converted character strings having been converted from a corresponding one of a plurality of original character strings, each of the plurality of original character strings being included in at least any one of one or more original images; generation means for generating, each time one of the plurality of converted character strings is acquired, a converted image in which the acquired converted character string is arranged in an area corresponding to a display area of the original character string corresponding to the acquired converted character string in the original image including the original character string; and changing means for changing, on a display device displaying at least a part of an object including one or more images on a screen based on display information, a content of a foreground of an arrangement area of the original image corresponding to the converted image generated by the generation means in the object to the converted image.

Further, a method of controlling an information processing system according to one embodiment of the present invention includes: acquiring a plurality of converted character strings one by one, each of the plurality of converted character strings having been converted from a corresponding one of a plurality of original character strings, each of the plurality of original character strings being included in at least any one of one or more original images; generating, each time one of the plurality of converted character strings is acquired, a converted image in which the acquired converted character string is arranged in an area corresponding to a display area of the original character string corresponding to the acquired converted character string in the original image including the original character string; and changing, on a display device displaying at least a part of an object including one or more images on a screen based on display information, a content of a foreground of an arrangement area of the original image corresponding to the converted image generated by the generation means in the object to the converted image.

Further, an information processing device according to one embodiment of the present invention includes: acquisition means for acquiring a plurality of converted character strings one by one, each of the plurality of converted character strings having been converted from a corresponding one of a plurality of original character strings, each of the plurality of original character strings being included in at least any one of one or more original images; generation means for generating, each time one of the plurality of converted character strings is acquired, a converted image in which the acquired converted character string is arranged in an area corresponding to a display area of the original character string corresponding to the acquired converted character string in the original image including the original character string; and changing means for changing, on a display device displaying at least a part of an object including one or more images on a screen based on display information, a content of a foreground of an arrangement area of the original image corresponding to the converted image generated by the generation means in the object to the converted image.

Further, a method of controlling an information processing device according to one embodiment of the present invention includes: acquiring a plurality of converted character strings one by one, each of the plurality of converted character strings having been converted from a corresponding one of a plurality of original character strings, each of the plurality of original character strings being included in at least any one of one or more original images; generating, each time one of the plurality of converted character strings is acquired, a converted image in which the acquired converted character string is arranged in an area corresponding to a display area of the original character string corresponding to the acquired converted character string in the original image including the original character string; and changing, on a display device displaying at least a part of an object including one or more images on a screen based on display information, a content of a foreground of an arrangement area of the original image corresponding to the converted image generated by the generation means in the object to the converted image.

Further, a program according to one embodiment of the present invention is a program for causing a computer to function as: acquisition means for acquiring a plurality of converted character strings one by one, each of the plurality of converted character strings having been converted from a corresponding one of a plurality of original character strings, each of the plurality of original character strings being included in at least any one of one or more original images; generation means for generating, each time one of the plurality of converted character strings is acquired, a converted image in which the acquired converted character string is arranged in an area corresponding to a display area of the original character string corresponding to the acquired converted character string in the original image including the original character string; and changing means for changing, on a display device displaying at least a part of an object including one or more images on a screen based on display information, a content of a foreground of an arrangement area of the original image corresponding to the converted image generated by the generation means in the object to the converted image.

Further, an information storage medium according to one embodiment of the present invention is a computer-readable information storage medium having recorded thereon a program for causing a computer to function as: acquisition means for acquiring a plurality of converted character strings one by one, each of the plurality of converted character strings having been converted from a corresponding one of a plurality of original character strings, each of the plurality of original character strings being included in at least any one of one or more original images; generation means for generating, each time one of the plurality of converted character strings is acquired, a converted image in which the acquired converted character string is arranged in an area corresponding to a display area of the original character string corresponding to the acquired converted character string in the original image including the original character string; and changing means for changing, on a display device displaying at least a part of an object including one or more images on a screen based on display information, a content of a foreground of an arrangement area of the original image corresponding to the converted image generated by the generation means in the object to the converted image.

Further, in one aspect of the present invention, the acquisition means acquires the plurality of converted character strings one by one, each of the plurality of converted character strings corresponding to one of the plurality of original character strings, in accordance with an order that is based on priorities of the plurality of original character strings.

Further, in one aspect of the present invention, the priority is set by setting means based on at least any one of a display mode of the original character string and an arrangement position of the image including the original character string in the object.

Further, in one aspect of the present invention, the priority is set by setting means based on a visual characteristic amount of the original character string in the object displayed based on the display information.

Further, in one aspect of the present invention, the information processing system further includes the setting means.

Further, in one aspect of the present invention, the information processing system further includes receiving means for receiving an acquisition request for any one of the images arranged in the foreground in the object from the display device, the display device transmitting the acquisition request at a predetermined timing for each image, and the changing means changes, each time the acquisition request is received, the content of the foreground of the arrangement area of the image corresponding to the acquisition request in the object to a converted image, which is generated by the generation means and includes more converted character strings to be arranged than the image arranged in the foreground of the arrangement area.

Further, in one aspect of the present invention, the information processing system further includes range information acquisition means for acquiring range information indicating a range in which the object is being displayed on the screen from the display device at a predetermined timing, and the setting means decreases the priority of an original character string not included in the range indicated by the range information by at least one level.

Further, in one aspect of the present invention, the information processing system further includes receiving means for receiving an acquisition request for any one of the images arranged in the foreground in the object from the display device, the display device transmitting an acquisition request for the image corresponding to the original character string at a predetermined timing in accordance with an order that is based on the priority set by the setting means, and the changing means changes, each time the acquisition request is received, the content of the foreground of the arrangement area of the image corresponding to the acquisition request in the object to a converted image, which is generated by the generation means and includes more converted character strings to be arranged than the image arranged in the foreground of the arrangement area.

Further, in one aspect of the present invention, the changing means incrementally changes on the display device the content of the foreground of the arrangement area of the original image corresponding to the generated converted image in the object to the converted image.

Advantageous Effects of Invention

According to the one embodiment of the present invention, the concentration of processing for generating the converted images can be avoided, which allows the processing load to be reduced.

BRIEF DESCRIPTION OF DRAWINGS

FIG. 1 is a diagram for illustrating an example of a configuration of a browsing system according to an embodiment of the present invention.

FIG. 2 is a diagram for illustrating an example of a hardware configuration of an image server.

FIG. 4 is a sequence diagram for illustrating an outline of an example of processing by the browsing system.

FIG. 5 is a diagram for illustrating an example of a processing flow by the image server.

FIG. 8 is a diagram for showing an example of a rendering process of an image.

FIG. 12A is a diagram for showing an example of a page including a pre-translation image.

FIG. 12C is a diagram for showing an example of a page including a post-translation image after full translation.

DESCRIPTION OF EMBODIMENTS

Figure 3A:
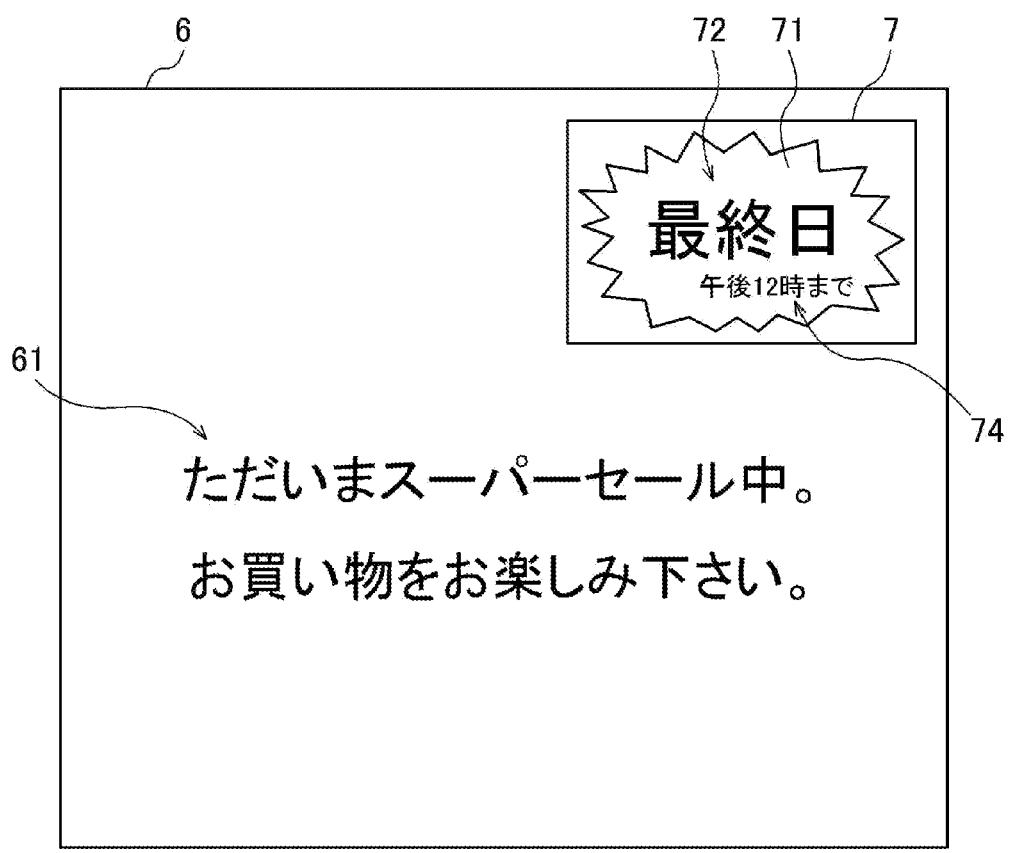
FIG. 3A is a diagram for showing an example of a pre-translation page.

An example of one embodiment of the present invention is now described in more detail with reference to the drawings.

FIG. 1 is a diagram for illustrating an example of a configuration of a browsing system 1 according to an embodiment of the present invention. The browsing system 1 includes a web server 2, an image server 3, a translation server 4, and a user terminal 10. The web server 2, the image server 3, the translation server 4, and the user terminal 10 are communicably connected to each other via a communication network 5.

The web server 2, the image server 3, and the translation server 4 are configured to communicate to/from the user terminal 10 based on a Hypertext Transfer Protocol (HTTP), for example. The web server 2 is a server configured to provide, for example, a virtual shopping mall site. The image server 3 includes, for example, a database for storing image data to be used in the virtual shopping mall site. The translation server 4 is a server configured to execute, for example, processing for translating a designated character string into another language. Note that, among the functions of the image server 3, a function for executing processing for generating an image may be included in another application server. Further, the web server 2 and the image server 3 may be integrated.

For example, an HTTP daemon is started in the web server 2, and a web browser is started in the user terminal 10. When a processing request (HTTP request) is transmitted from the user terminal 10 to the web server 2, a processing result (HTTP response) corresponding to the processing request is transmitted from the web server 2 to the user terminal 10. For example, the web server 2 transmits page data written in a webpage description language to the user terminal 10, and the user terminal 10 displays a page on a screen based on the received page data.

FIG. 2 is a diagram for illustrating an example of a hardware configuration of the image server 3. The image server 3 is realized by, for example, a desktop type computer, a laptop type computer, and the like.

As illustrated in FIG. 2, the image server 3 includes a control unit 11, a storage unit 12, an optical disc drive unit 13, a communication interface unit 14, an operation unit 15, a display unit 16, and an audio output unit 17.

The control unit 11, which includes, for example, one or more microprocessors, is configured to execute information processing based on an operating system or a program stored in the storage unit 12. The storage unit 12 includes, for example, a random-access memory (RAM), a hard disk, or a solid state drive. The optical disc drive unit 13 is configured to read programs and data stored in an optical disc (an information storage medium).

Programs and data are supplied to the storage unit 12 via the optical disc. In other words, programs and data are read from the optical disc by the optical disc drive unit 13, and stored in the storage unit 12. Note that, the image server 3 may also include a constituent element for reading programs or data stored in an information storage medium other than an optical disc (e.g., a memory card). Further, programs and data may be supplied to the storage unit 12 via an information storage medium other than an optical disc.

The communication interface unit 14 is an interface configured to connect the image server 3 to a communication network. The image server 3 is capable of transmitting/receiving data to/from another device via the communication network. Note that, programs and data may also be supplied to the storage unit 12 via the communication network.

The operation unit 15 is a unit that allows the user to perform operations. For example, the operation unit 15 may be a keyboard, a mouse, a touch pad, a touch panel, a stick (a lever), or the like. The display unit 16 is, for example, a liquid crystal display or an organic EL display. The audio output unit 17 is, for example, a speaker, a headphone jack, or the like.

Note that, the user terminal 10, the web server 2, and the translation server 4 also have the same configuration as the image server 3 described above.

FIG. 3A is a diagram for showing an example of an original page before being translated (hereinafter referred to as pre-translation page 6). In other words, the pre-translation page 6 is a page displayed when page data held by the web server 2 has been processed by the user terminal 10 without undergoing translation processing by the translation server 4 and the like.

The pre-translation page 6, which is a page displayed based on page data as display information, includes a character string (hereinafter referred to as pre-translation character string 61). The pre-translation character string 61 is a character string described in the page data, and, displayed in the pre-translation page 6. For example, in the case of page data written in HTML, the pre-translation character string 61 is a character string described in a "body" tag. In this embodiment, the pre-translation character string 61 is a character string in Japanese saying "ただいまスーパ

一セール中。お 買い物をお楽しみ下さい。" ("Now on Super Sale. Please enjoy your shopping.").

Further, the pre-translation page 6 includes an original image in which a character string is represented (hereinafter referred to as pre-translation image 7). The pre-translation image 7 is an image whose location is described in the page data, and, which is displayed in the pre-translation page 6. For example, in the case of page data written in HTML, a uniform resource locator (URL) representing the location of the pre-translation image 7 is described in an "img" tag.

The pre-translation image 7 is an image in which, for example, a plurality of character strings (hereinafter referred to as pre-translation character strings 72 and 74) and a background image 71 are integrated, with the pre-translation character strings 72 and 74 being written on the background image 71. The first pre-translation character string 72 is arranged in a comparatively large size in a center portion of the background image 71. In this embodiment, the first pre-translation character string 72 is, for example, a character string in Japanese saying "最終日" ("FINAL DAY"), indicating the final day of a bargain sale and the like. On the other hand, the second pre-translation character string 74 is arranged in a comparatively small size at a position away from the center of the background image 71, and hence is not as noticeable as the first pre-translation character string 72. In this embodiment, the second pre-translation character string 74 is, for example, a character string in Japanese saying "午後12時まで" ("until 12 p.m."), which indicates the finish time on the final day more specifically.

Note that, in this type of pre-translation image 7, in many cases the pre-translation character strings 72 and 74 are written in a different color from the background image 71 so as to be noticeable. Further, the pre-translation character strings 72 and 74 are often written in a single color, and are arranged in a horizontal direction, a vertical direction, or in a diagonal direction.

Figure 3B:
FIG. 3B is a diagram for showing an example of a post-translation page.

FIG. 3B is a diagram for showing an example of a post-translation page 8. The post-translation page 8 is a page after the pre-translation character string 61 written in the pre-translation page 6 in FIG. 3A and the pre-translation character strings 72 and 74 represented in the pre-translation image 7 included in the pre-translation page 6, have been translated. In other words, the post-translation page 8 is a page displayed when page data held by the web server 2 has been processed by the user terminal 10 after undergoing a series of translation processes described later by the translation server 4 and the like.

The post-translation page 8 includes a character string (hereinafter referred to as post-translation character string 81) translated from the pre-translation character string 61. In this embodiment, the post-translation character string 81 is a character string in English saying "Now on Super Sale. Please enjoy your shopping."

Further, the post-translation page 8 includes, as a converted image, an image (hereinafter referred to as post-translation image 9) in which character strings (hereinafter referred to as post-translation character strings 92 and 94) translated from the pre-translation character strings 72 and 74 are represented. The post-translation image 9 is an image in which the same background image 71 as in the pre-translation image 7 and the post-translation character strings 92 and 94 are integrated, with the post-translation character strings 92 and 94 being written on the background image 71.

Similar to the first pre-translation character string 72, a first post-translation character string 92 is arranged in a comparatively large size in a center portion of the background image 71. In this embodiment, the first post-translation character string 92 is, for example, a character string in English saying "FINAL DAY", which corresponds to the Japanese "最終日". On the other hand, similar to the second pre-translation character string 74, a second post-translation character string 94 is arranged in a comparatively small size at a position away from the center of the background image 71. In this embodiment, the second post-translation character string 94 is, for example, a character string in English saying "until 12 p.m.", which corresponds to the Japanese "午後12時まで".

Note that, in this embodiment, character strings in Japanese are translated into English. However, the combination of the pre-translation language and the post-translation language is not limited to such a mode. Further, the character strings may be converted into different types of characters of the same language. For example, a character string in kanji (Chinese characters used in Japanese) may be converted into a character string in hiragana (one syllabary used in Japanese) or a character string in katakana (another syllabary used in Japanese). Further, the number of characters included in a character string is not limited to being more than one, but a character string may be formed from a single character.

The processing that is carried out until a post-translation page 8 such as that shown in FIG. 3B is displayed based on the page data of a pre-translation page 6 such as that shown in FIG. 3A is now described.

FIG. 4 is a sequence diagram for illustrating an outline of an example of processing by the browsing system 1.

In Step S101, the user terminal 10 transmits a translation request to the translation server 4. The translation request includes location information representing the location of the original page data of a translation target. In this case, the location information represents a location of the original page data held by the web server 2. Further, the translation request includes language designation information designated by the user indicating the pre-translation language and the post-translation language.

In Step S102, the translation server 4 transmits a page request requesting the original page data of the translation target to the web server 2 based on the location information included in the received translation request.

In Step S103, the web server 2 transmits the original page data of the translation target to the translation server 4 based on the received page request.

In Step S104, the translation server 4 translates the received original page data of the translation target. The translation server 4 converts the original page data written in the pre-translation language into page data written in the post-translation language (hereinafter referred to as post-translation page data) based on the language designation information included in the received translation request. In the example shown in FIG. 3A, the target to be converted into the post-translation language is the pre-translation character string 61 displayed in the pre-translation page 6. For example, in the case of page data written in HTML, the target is the character string described in the "body" tag. Further, the translation server 4 adds the language designation information to the post-translation page data.

In Step S105, the translation server 4 transmits the generated post-translation page data to the user terminal 10.

In Step S106, the user terminal 10 renders a post-translation page that does not include an image on the screen of the display unit based on the received post-translation page data, and transmits an image request requesting the image data to the image server 3. The image request includes location information representing the location of the image data designated by the post-translation page data. In this case, the location information represents the location of the pre-translation image data held by the image server 3. In the example shown in FIG. 3A, the location of the pre-translation image 7 displayed in the pre-translation page 6 is indicated in the location information. Further, language designation information is added to the image request. Addition of language designation information is carried out by, for example, the user terminal 10 executing script processing designated by the page data.

When language designation information indicating that the original page data has been translated is added to the received image request, the image server 3 executes a series of processes from Step S107 onwards. The series of processes from Step S107 onwards executed by the image server 3 is now briefly described. However, a specific example of the processing performed by the image server 3, and a specific example of the processing performed by the user terminal 10 carried out in response to the processing by the image server 3, are described later.

In Step S107, the image server 3 specifies an area of the pre-translation character string represented in the pre-translation image data specified by the image request.

In Step S108, the image server 3 determines a translation priority regarding the pre-translation character string for which an area has been specified (an example of the image server 3 functioning as a setting unit). In other words, the image server 3 determines an order for acquiring a plurality of post-translation character strings one by one.

The image server 3 performs partial translation processing (SP1) on one of the pre-translation character strings to which a first priority has been assigned. Specifically, the image server 3 acquires the character data of the pre-translation character string having the first priority (S109), and transmits the character data and the translation request including the language designation information to the translation server 4 (S110). The translation server 4 translates the pre-translation character string having the first priority (S111), and transmits the character data of the post-translation character string to the image server 3 (S112). Next, the image server 3 generates post-translation image data in which the acquired post-translation character string is represented (S113). In this manner, the image server 3 acquires one of the post-translation character strings, and generates post-translation image data in which the acquired post-translation character string is represented (an example of the image server 3 functioning as acquisition means and as generation means).

In Step S114, the image server 3 transmits the post-translation image data acquired by the partial translation processing (SP1) to the user terminal 10.

Next, the image server 3 performs partial translation processing (SP2) on another one of the pre-translation character strings to which a second priority has been assigned. The content of the partial translation processing (SP2) is the same as the content of the partial translation processing (SP1) described above. As a result of the partial translation processing (SP2), the image server 3 acquires another one of the post-translation character strings, and generates post-translation image data in which the acquired post-translation character string is represented. This partial translation processing is repeated until partial translation processing has been carried out on all of the pre-translation character strings.

Further, the image server 3 adds order information representing a generated order to the sequentially-generated post-translation image data. In addition, the image server 3 adds a finish notification to the post-translation image data generated last.

The post-translation image data sequentially generated by the image server 3 is stored in a database (not shown), and is read out in order of oldest to newest for transmission to the user terminal 10 based on an image request from the user terminal 10.

In Step S115, the user terminal 10 renders the acquired post-translation image data in the post-translation page displayed on the screen in the display unit (an example of the user terminal 10 functioning as changing means).

In Step S116, the user terminal 10 again transmits an image request to the image server 3. In this case, the user terminal 10 transmits the image request to the image server 3 at each predetermined timing. For example, the image request is transmitted after a predetermined period has elapsed since an image was previously acquired, or is transmitted at fixed intervals.

In Step S117, the image server 3 transmits the next-generated post-translation data of the post-translation image data transmitted in Step S114 to the user terminal 10.

In Step S118, the user terminal 10 renders the acquired post-translation image data in the post-translation page displayed on the screen in the display unit (an example of the user terminal 10 functioning as the changing means).

Transmission of the image request by the user terminal 10 is repeated until a finish notification is detected as having been added to the received post-translation image data.

Note that, the present invention is not limited to the content described above. The processing may also be carried out by, after the user terminal 10 has transmitted the image request in Step S106, the image server 3 transmitting the pre-translation image data to the user terminal 10, the user terminal 10 rendering the pre-translation image data in the post-translation page, and then the user terminal 10 repeatedly transmitting an image request for acquiring the post-translation image data.

Note that, in this embodiment, the processing for generating the post-translation image data is carried out by the image server 3. However, the present invention is not limited to this. The processing may be carried out by the web server 2 or by another application server.

A specific example of the processing performed by the image server 3, and a specific example of the processing performed by the user terminal 10 in response to the processing performed by the image server 3, are now described.

First Processing Example

Figure 6:
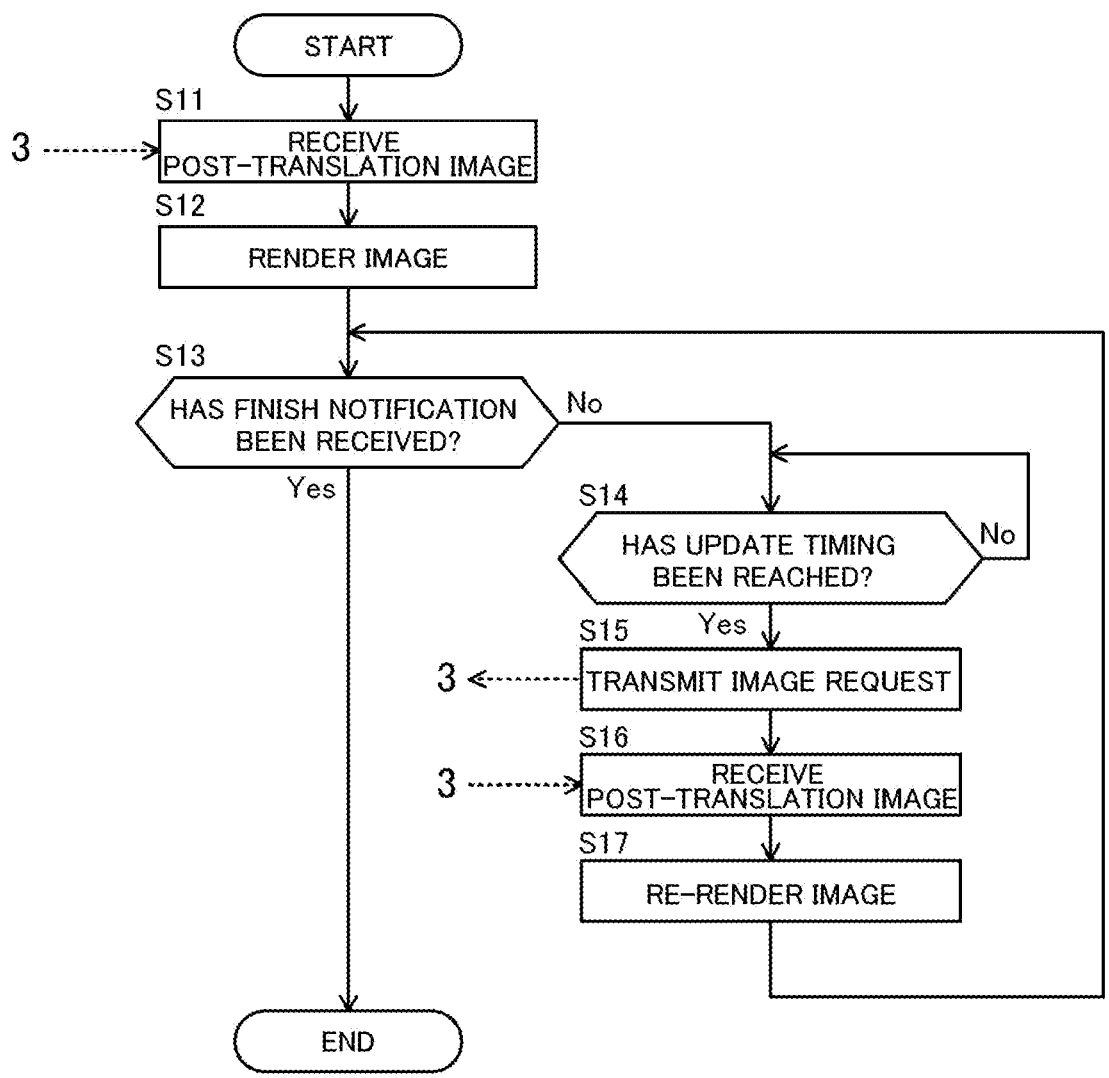
FIG. 6 is a diagram for illustrating an example of a processing flow by a user terminal.

FIG. 5 is a diagram for illustrating an example of a processing flow by the image server 3. The processing flow illustrated in FIG. 5 is realized by, for example, the control unit of the image server 3 executing a program stored in the storage unit of the image server 3. FIG. 6 is a diagram for illustrating an example of a processing flow by the user terminal 10. The processing flow illustrated in FIG. 6 is realized by, for example, the control unit of the user terminal 10 executing script processing designated in page data. The processing examples illustrated in FIG. 5 and FIG. 6 correspond to the series of processes performed from Step S107 onwards in FIG. 4.

Figure 7A:
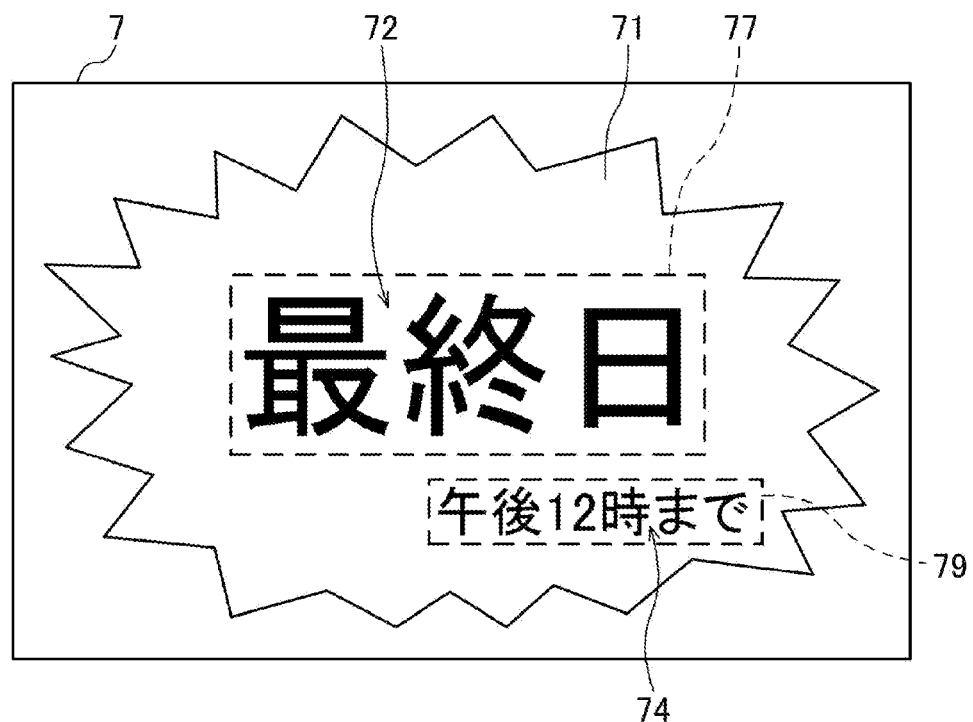
FIG. 7A is a diagram for showing an example of a pre-translation image.
Figure 7B:
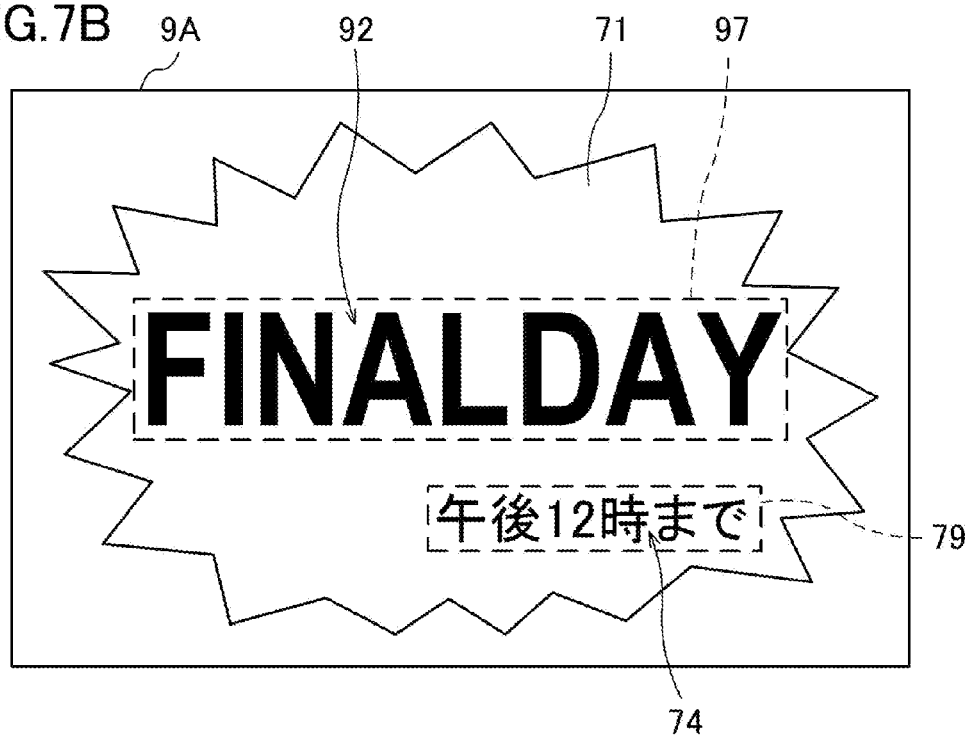
FIG. 7B is a diagram for showing an example of a post-translation image after partial translation.
Figure 7C:
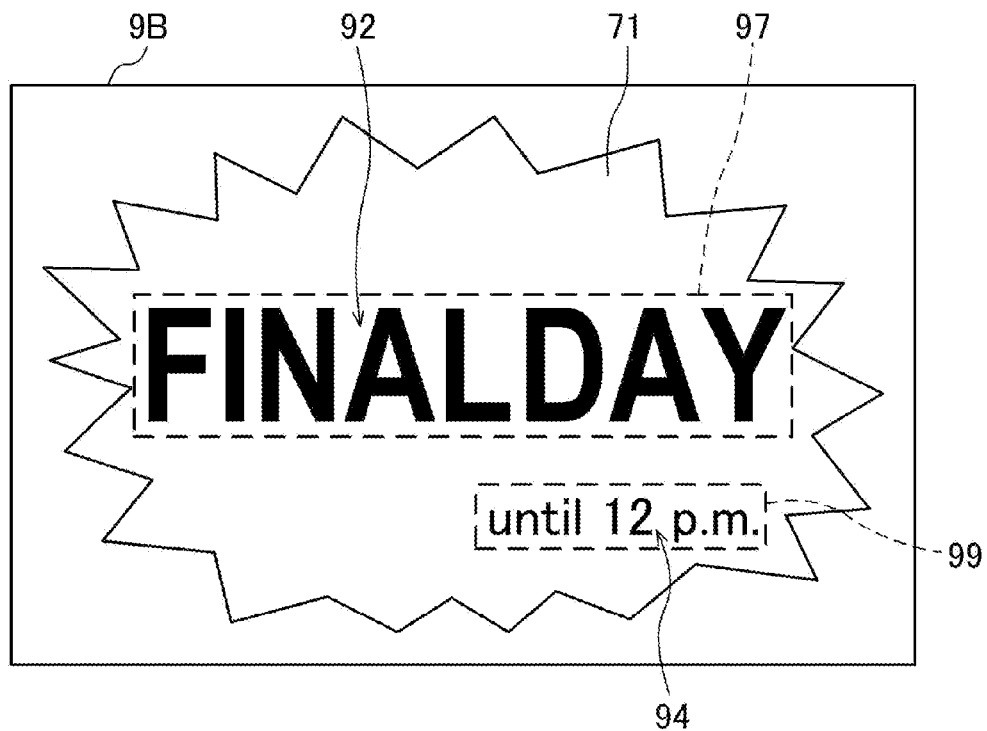
FIG. 7C is a diagram for showing an example of a post-translation image after full translation.

FIG. 7A is a diagram for showing an example of the pre-translation image 7 to be processed in this example. The pre-translation image 7 is the same as the pre-translation image 7 shown in FIG. 3A. In other words, the pre-translation image 7 is, for example, an image in which the background image 71 and the plurality of pre-translation character strings 72 and 74 are integrated. The first pre-translation character string 72 is, for example, a character string in Japanese saying "最終日" ("FINAL DAY"), which is arranged in a comparatively large size in a center portion of the background image 71. On the other hand, the second pre-translation character string 74 is, for example, a character string in Japanese saying "午後 1 2 時まで" ("until 12 p.m."), which is arranged in a comparatively small size at a position away from the center of the background image 71, and hence is not as noticeable as the first pre-translation character string 72. Further, FIG. 7B is a diagram for showing an example of a post-translation image 9A after partial translation, and FIG. 7C is a diagram for showing an example of a post-translation image 9B after full translation.

In Step S31 illustrated in FIG. 5, the image server 3 receives an image request from the user terminal 10. The image request includes location information representing the location of the pre-translation image 7 and language designation information.

In Step S32, the image server 3 acquires the pre-translation image 7 specified by the received image request from an image database (not shown).

In Step S33, the image server 3 specifies an area including the pre-translation character string 72 (hereinafter referred to as character string area 77) and an area including the pre-translation character string 74 (hereinafter, referred to as character string area 79) in the pre-translation image 7. In FIG. 7A, the dotted line surrounding the first pre-translation character string 72 indicates the character string area 77 of the first pre-translation character string 72, and the dotted line surrounding the second pre-translation character string 74 indicates the character string area 79 of the second pre-translation character string 74.

The specification of the character string areas can be carried out as a part of known character recognition processing, which is also referred to as optical character recognition (OCR), for example. In character recognition processing, each character included in a character string is recognized by specifying an area of the character string in the image, and comparing a character pattern in that area with a character pattern registered in advance.

In Step S34, the image server 3 determines a translation priority regarding the pre-translation character strings 72 and 74 for which the character string area 77 and character string area 79 have been specified, respectively. The image server 3 determines the translation priority based on the display mode of each of the pre-translation character strings 72 and 74, for example.

The display mode is, for example, the position at which the character string is arranged, the size of the character string, the color of the character string itself, a color difference between the character string and the background, and the like. When determining the priority, a higher priority is assigned to the character string having a display mode that is more noticeable, for example. Examples of technology for specifying a location that is noticeable in the image include a saliency map.

In the pre-translation image 7 of this example, the first pre-translation character string 72 is determined to be more noticeable than the second pre-translation character string 74 because the first pre-translation character string 72 is larger and closer to the center. Therefore, a higher priority is assigned to the first pre-translation character string 72 than to the second pre-translation character string 74.

In Step S35, the image server 3 acquires the character data representing the first pre-translation character string 72 having the higher priority among the pre-translation character strings 72 and 74 in the pre-translation image 7. The character data includes a character code for each character, for example. Known character recognition processing may be employed to acquire the character data, for example.

Note that, in this example, the character data of the plurality of pre-translation character strings 72 and 74 represented in the pre-translation image 7 is extracted as the translation target by character recognition processing. However, the present invention is not limited to this mode. A character string readably-added to the pre-translation page 6 or the pre-translation image 7 may be employed as the translation target, and character data may be read from the character string. For example, in the case of page data written in HTML, a character string having an alt attribute that is not indicated in the page may be written in the "img" tag. In such a case, the image server 3 may acquire the character data from the page data by employing such a character string as the translation target.

In Step S36, the image server 3 transmits a translation request including the acquired character data representing the first pre-translation character string 72 and the language designation information to the translation server 4.

In Step S37, the image server 3 receives the character data of the first post-translation character string 92 corresponding to the first pre-translation character string 72 translated by the translation server 4. The first post-translation character string 92 is, for example, a character string in English saying "FINAL DAY".

In Step S38, the image server 3 generates the post-translation image 9A so that the first post-translation character string 92 is represented. Specifically, the image server 3 acquires the character image representing the first post-translation character string 92 from a font database (not shown), and combines the acquired character image with the pre-translation image 7. As a result, a post-translation image 9A after partial translation such as that shown in FIG. 7B is generated. In other words, in the post-translation image 9A after partial translation, only the first pre-translation character string 72 has been replaced with the first post-translation character string 92, and the second pre-translation character string 74 has not been translated and remains as is.

When combining the character image representing the first post-translation character string 92, for example, the position and the size of the character image are adjusted so that the character string area 97 of the first post-translation character string 92 covers the whole of the character string area 77 (refer to FIG. 7A) of the first pre-translation character string 72. Further, in the character string area 97 of the first post-translation character string 92, the background pixels other than the pixels forming the character image are made the same color as the pixels of the background of the character string area 77 (refer to FIG. 7A) of the first pre-translation character string 72, for example.

Note that, when the image server 3 associatively holds the background image 71 with the pre-translation image 7, the post-translation image 9A after partial translation may be generated by combining the character image representing the first post-translation character string 92 with the background image 71. In this case, in the generated post-translation image 9A after partial translation, only the first post-translation character string 92 is arranged on the background image 71, and the second pre-translation character string 74 and the second post-translation character string 94 are not arranged on the background image 71.

In Step S39, the image server 3 temporarily stores the generated post-translation image 9A after partial translation in the database (not shown). The post-translation image 9A after partial translation stored in this case includes order information indicating the fact that this post-translation image 9A after partial translation has been generated first.

In addition, the image server 3 executes the processing of Steps S35 to S39 on the second pre-translation character string 74 having the lower priority among the pre-translation character strings 72 and 74 in the pre-translation image 7 (S40: No).

In Step S35, the image server 3 acquires the character data representing the second pre-translation character string 74 having the lower priority among the pre-translation character strings 72 and 74 in the pre-translation image 7.

In Step S36, the image server 3 transmits a translation request including the acquired character data representing the second pre-translation character string 74 and the language designation information to the translation server 4.

In Step S37, the image server 3 receives the character data of the second post-translation character string 94 corresponding to the second pre-translation character string 74 translated by the translation server 4. The second post-translation character string 94 is, for example, a character string in English saying "until 12 p.m."

In Step S38, the image server 3 generates the post-translation image 9B so that the first post-translation character string 92 and the second post-translation character string 94 are represented. Specifically, the image server 3 acquires the character image representing the second post-translation character string 94 from the font database (not shown), and combines the acquired character image with the post-translation image 9A after partial translation. As a result, a post-translation image 9B after full translation such as that shown in FIG. 7C is generated. In other words, in the post-translation image 9B after full translation, both of the first pre-translation character string 72 and the second pre-translation character string 74 have been replaced with the first post-translation character string 92 and the second post-translation character string 94, respectively.

When combining the character image representing the second post-translation character string 94, for example, the position and the size of the character image are adjusted so that the character string area 99 of the second post-translation character string 94 covers the whole of the character string area 79 (refer to FIG. 7A) of the second pre-translation character string 74. Further, in the character string area 99 of the second post-translation character string 94, the background pixels other than the pixels forming the character image are made the same color as the pixels of the background of the character string area 79 (refer to FIG. 7A) of the second pre-translation character string 74, for example.

In Step S39, the image server 3 temporarily stores the generated post-translation image 9B after full translation in the database (not shown). The post-translation image 9B after full translation stored in this case includes order information indicating the fact that this post-translation image 9B after full translation has been generated second and a finish notification indicating that this post-translation image 9B is the last one.

In Step S11 illustrated in FIG. 6, the user terminal 10 receives the post-translation image 9A after partial translation from the image server 3. In Step S12, the user terminal 10 renders the post-translation image 9A after partial translation in the post-translation page 8.

In Step S14, the user terminal 10 determines whether or not an update timing has been reached. When the update timing has been reached (S14: Yes), in Step S15, the user terminal 10 transmits an image request to the image server 3.

In Step S16, the user terminal 10 receives the post-translation image 9B after full translation from the image server 3. In Step S17, the user terminal 10 renders the post-translation image 9B after full translation in the post-translation page 8.

As a result, the post-translation image 9A after partial translation in the post-translation page 8 is replaced with the post-translation image 9B after full translation, and the post-translation page 8 shown in FIG. 3B is displayed.

Then, when the user terminal 10 detects a finish notification added to the post-translation image 9B after full translation (S13: Yes), the user terminal 10 finishes the processing.

FIG. 8 is a diagram for showing an example of a rendering process when replacing the post-translation image 9A after partial translation with the post-translation image 9B after full translation. Over time the user terminal 10 increases the ratio of pixels of the post-translation image 9B after full translation that have replaced the pixels of the post-translation image 9A after partial translation. As a result, the post-translation image 9A after partial translation is incrementally replaced with the post-translation image 9B after full translation. For example, the user terminal 10 divides the post-translation image 9B after full translation into blocks including one or more pixels, and over time gradually increases the number of blocks that are displayed. The mode for increasing the number of blocks is not particularly limited, and may be carried out by, for example, gradually increasing the number of blocks in a dispersed manner, or by increasing the number of blocks starting from one side and moving toward another side. Further, as the post-translation images 9A and 9B, an image, such as a progressive JPEG image and an interlaced GIF image, that gradually becomes more detailed as a download progresses may be used.

Second Processing Example

Figure 9:
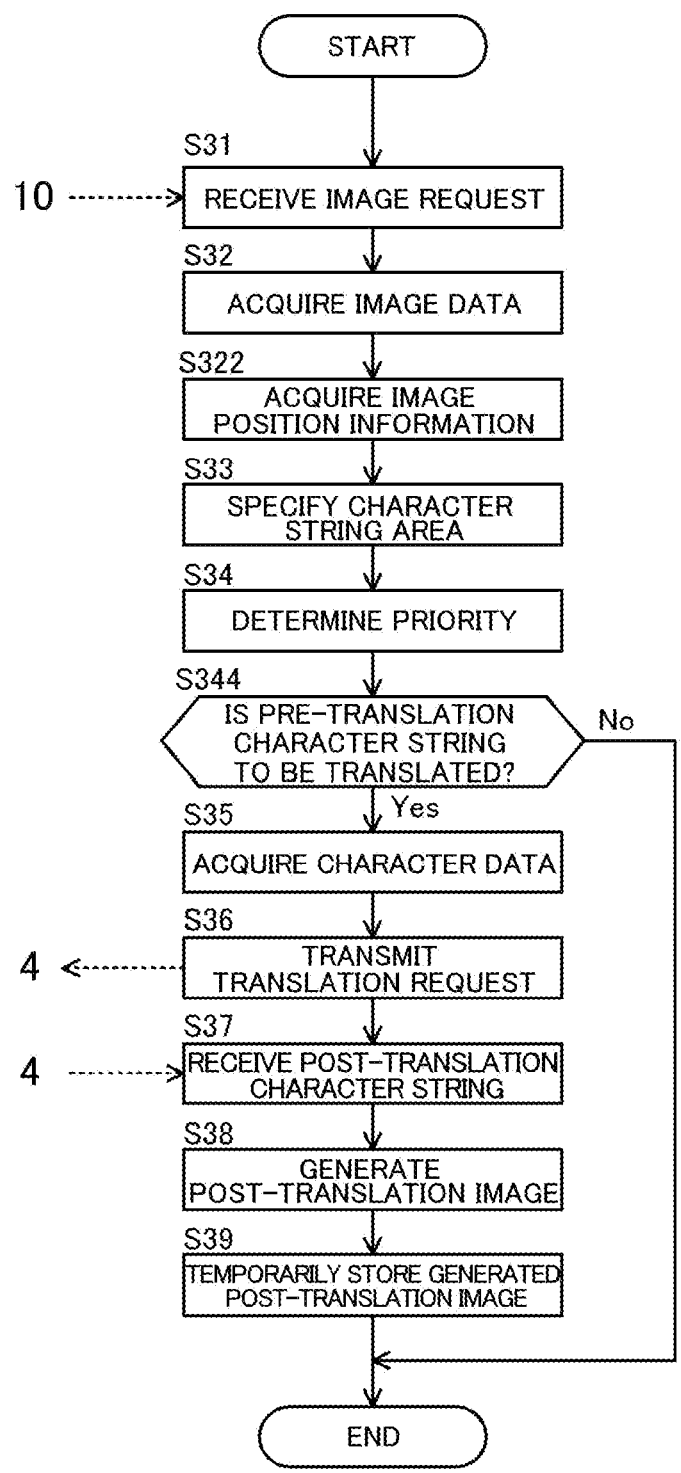
FIG. 9 is a diagram for illustrating an example of a processing flow by the image server.

FIG. 9 is a diagram for illustrating an example of a processing flow by the image server 3. In the description of the second processing example, steps that are similar to those in the first processing example are denoted using the same step number, and a detailed description thereof is omitted in part.

Figure 10A:
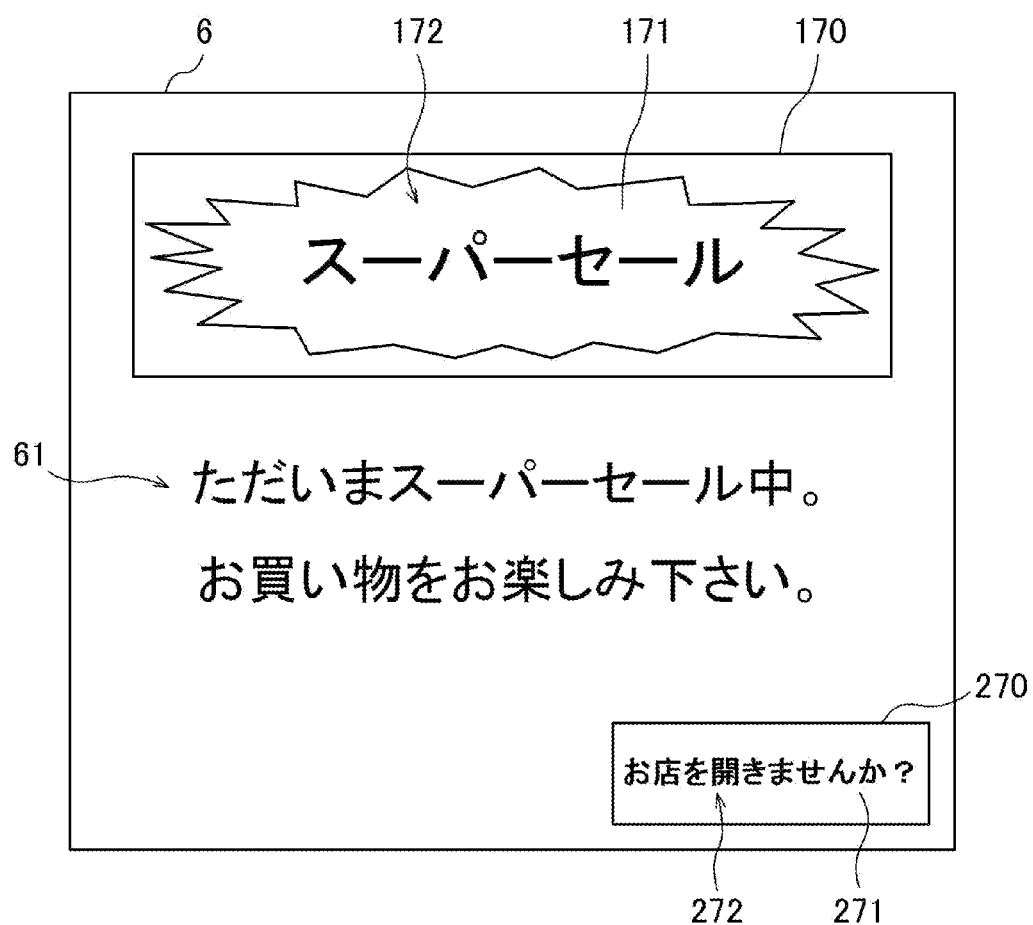
FIG. 10A is a diagram for showing an example of a page including a pre-translation image.

FIG. 10A is a diagram for showing an example of the pre-translation page 6 including a plurality of pre-translation images 170 and 270 to be processed in this example. A first pre-translation image 170 is, for example, an image in which a background image 171 and a pre-translation character string 172 are integrated. The pre-translation character string 172 is, for example, a character string in Japanese saying "スーパーセール" ("Super Sale"). The first pre-translation image 170 is arranged in a comparatively large size across the whole upper portion of the pre-translation page 6. On the other hand, a second pre-translation image 270 is, for example, an image in which a background image 271 and a pre-translation character string 272 are integrated. The pre-translation character string 272 is, for example, a character string in Japanese saying "お店を開きませんか?" ("Would you like to open your shop?"). The second pre-translation image 270 is arranged in a comparatively small size at the bottom right of the pre-translation page 6, and hence is not as noticeable as the first pre-translation character image 170.

Figure 10B:
FIG. 10B is a diagram for showing an example of a page including a post-translation image after partial translation.
Figure 10C:
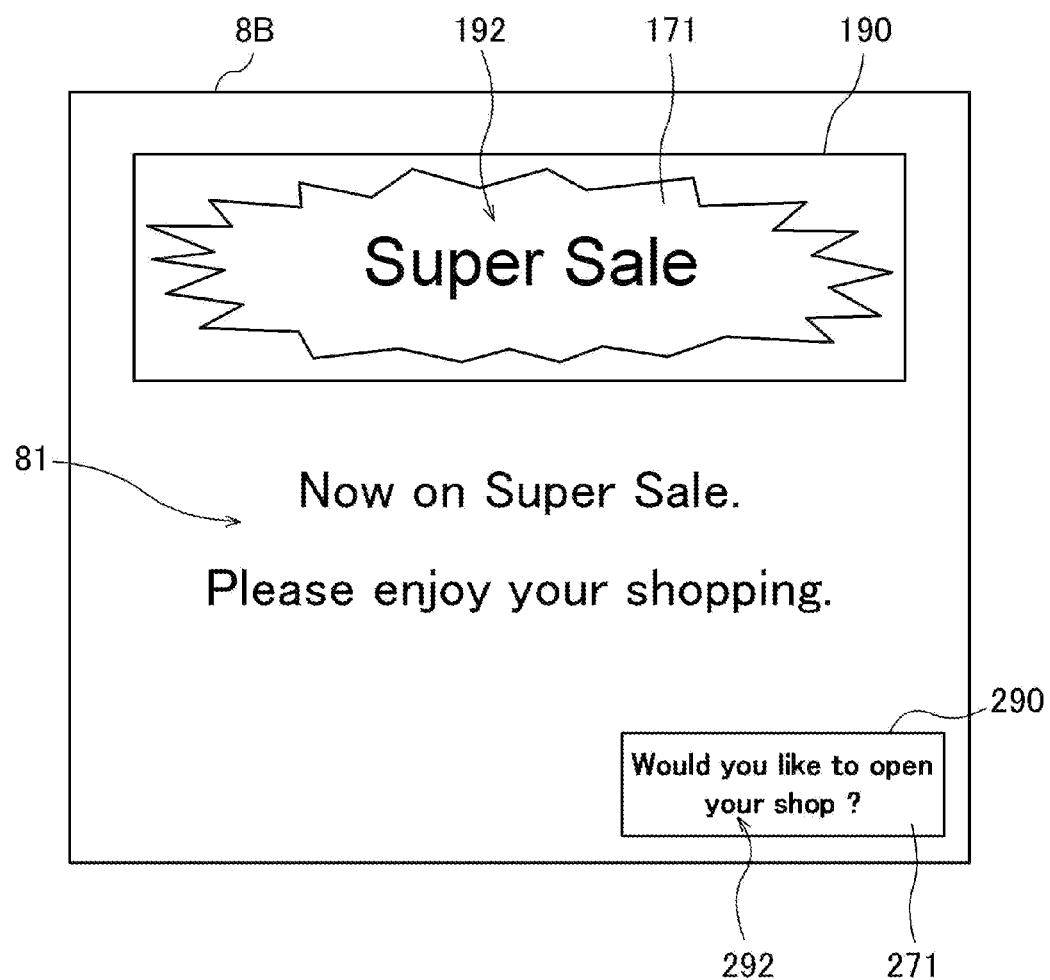
FIG. 10C is a diagram for showing an example of a page including a post-translation image after full translation.

Further, FIG. 10B is a diagram for showing an example of a post-translation page 8A after partial translation, and FIG. 10C is a diagram for showing an example of a post-translation page 8B after full translation.

The user terminal 10 transmits an image request for the pre-translation images 170 and 270 in accordance with a predetermined order, and repeats this process until translation of all of the pre-translation images is completed. The image server 3 executes the processing illustrated in FIG. 9 each time an image request is received. In the following example, the image server 3 first receives an image request for the first pre-translation image 170, and then receives an image request for the second pre-translation image 270.

In Step S31, the image server 3 receives an image request for the first pre-translation image 170 from the user terminal 10. The image request includes location information representing the location of the first pre-translation image 170 and language designation information.

In Step S32, the image server 3 acquires the first pre-translation image 170 specified by the received image request from the image database (not shown).

In Step S322, the image server 3 acquires image position information representing the position of the first pre-translation image 170 in the pre-translation page 6. For example, the image server 3 may acquire the image position information by acquiring page data from the user terminal 10, the web server 2, or the translation server 4, and analyzing the acquired page data. Alternatively, the image position information may be added to the image request transmitted from the user terminal 10 in Step S31.

In Step S33, the image server 3 specifies a character string area of the first pre-translation character string 172 in the first pre-translation image 170.

In Step S34, the image server 3 determines a translation priority regarding the first pre-translation character string 172. The image server 3 determines the translation priority based on, for example, the position of the first pre-translation image 170 in the pre-translation page 6.

When determining the priority, a higher priority is assigned to, for example, the pre-translation character string of the pre-translation image occupying a position that is more noticeable in the page. Examples of technology for specifying a location that is noticeable in the page include a saliency map.

For the pre-translation page 6 in this example, the first pre-translation image 170 occupies a large part of the noticeable portion of the pre-translation page 6, and hence the first priority is assigned to the first pre-translation character string 172 added to the first pre-translation image 170.

In Step S344, based on the priority, the image server 3 determines whether or not the first pre-translation character string 172 is to be translated. In this example, because the first priority is assigned to the first pre-translation character string 172, the image server 3 determines that the first pre-translation character string 172 is to be translated (S344: Yes).

In Step S35, the image server 3 acquires the character data representing the first pre-translation character string 172 from the first pre-translation image 170.

In Step S36, the image server 3 transmits a translation request including the acquired character data representing the first pre-translation character string 172 and the language designation information to the translation server 4.

In Step S37, the image server 3 receives the character data of the first post-translation character string 192 corresponding to the first pre-translation character string 172 translated by the translation server 4. The first post-translation character string 192 is, for example, a character string in English saying "Super Sale".

In Step S38, the image server 3 generates the first post-translation image 190 so that the first post-translation character string 192 is represented. Specifically, the image server combines the character image representing the first post-translation character string 192 with the first pre-translation image 170. As a result, a first post-translation image 190 such as that shown in FIG. 10B is generated.

In Step S39, the image server 3 temporarily stores the generated first post-translation image 190 in the database (not shown). The first post-translation image 190 stored in this case includes a finish notification indicating that translation has been completed.

Next, the processing returns to Step S31, and the image server 3 receives an image request for the second pre-translation image 270 from the user terminal 10. The image request includes location information representing the location of the second pre-translation image 270 and language designation information.

In Step S32, the image server 3 acquires the second pre-translation image 270 specified by the received image request from the image database (not shown).

In Step S322, the image server 3 acquires image position information representing the position of the second pre-translation image 270 in the pre-translation page 6.

In Step S33, the image server 3 specifies a character string area of the second pre-translation character string 272 in the second pre-translation image 270.

In Step S34, the image server 3 determines a translation priority regarding the second pre-translation character string 272. The image server 3 determines the translation priority based on, for example, the position of the second pre-translation image 270 in the pre-translation page 6.

For the pre-translation page 6 in this example, the second pre-translation image 270 does not occupy a large part of the noticeable portion of the pre-translation page 6, and hence the second priority is assigned to the second pre-translation character string 272 added to the second pre-translation image 270.

In Step S344, based on the priority, the image server 3 determines whether or not the second pre-translation character string 272 is to be translated. In this example, because the second priority is assigned to the second pre-translation character string 272, the image server 3 determines that the second pre-translation character string 272 is not to be translated (S344: No).

At the point when the first round of processing has been completed, the user terminal 10 is capable of acquiring the translated first post-translation image 190 as a response to an image request for the first pre-translation image 170, and the non-translated second pre-translation image 270 as a response to an image request for the second pre-translation image 270. In this case, a post-translation page 8A after partial translation such as that shown in FIG. 10B is displayed. In other words, in the post-translation page 8A after partial translation, only the first pre-translation image 170 has been replaced with the first post-translation image 190, and the second pre-translation image 270 has not been translated and remains as is.

In addition, the image server 3 receives from the user terminal 10 an image request for a second round of processing. At this point, the user terminal 10 may skip transmission of an image request for the first pre-translation image 170 for which translation is already complete. In this case, the image server 3 receives an image request for the second pre-translation image 270.

In Steps S32 to S34, in the same manner as described above, the image server 3 acquires the second pre-translation image 270 and image position information, specifies the character string area of the second pre-translation character string 272, and determines the translation priority. In this case, when the image server 3 holds information on the priority determined in the first round of processing, Steps S32 to S34 may be omitted.

The image server 3 determines whether or not the second pre-translation character string 272 is to be translated based on the priority. In this example, because the translation of the first priority is already complete, the translation target is the second pre-translation character string 272 to which the second priority has been assigned (S344: Yes).

In Step S35, the image server 3 acquires the character data representing the second pre-translation character string 272 from the second pre-translation image 270.

In Step S36, the image server 3 transmits a translation request including the acquired character data representing the second pre-translation character string 272 and the language designation information to the translation server 4.

In Step S37, the image server 3 receives the character data of the second post-translation character string 292 corresponding to the second pre-translation character string 272 translated by the translation server 4. The second post-translation character string 292 is, for example, a character string in English saying "Would you like to open your shop?"

In Step S38, the image server 3 generates the second post-translation image 290 so that the second post-translation character string 292 is represented. Specifically, the image server 3 combines the character image representing the second post-translation character string 292 with the second pre-translation image 270. As a result, a second post-translation image 290 such as that shown in FIG. 10C is generated.

In Step S39, the image server 3 temporarily stores the generated second post-translation image 290 in the database (not shown). The second post-translation image 290 stored in this case includes a finish notification indicating that translation has been completed.

At the point when the second round of processing has been completed, the user terminal 10 is capable of acquiring the translated second post-translation image 290 as a response to an image request for the second pre-translation image 270. In this case, a post-translation page 8B after full translation such as that shown in FIG. 10C is displayed. In other words, in the post-translation page 8B after full translation, the pre-translation images 170 and 270 have respectively been replaced with the post-translation images 190 and 290.

Further, when the user terminal 10 detects a finish notification of both of the post-translation images 190 and 290, the user terminal 10 stops transmitting image requests.

Note that, in this example, the user terminal 10 transmits an image request for the pre-translation images 170 and 270 in accordance with a predetermined order. However, the present invention is not limited to this mode. The order for transmitting the image requests for the pre-translation images 170 and 270 by the image server 3 may be determined based on a priority, and designated in the user terminal 10.

Third Processing Example

Figure 11:
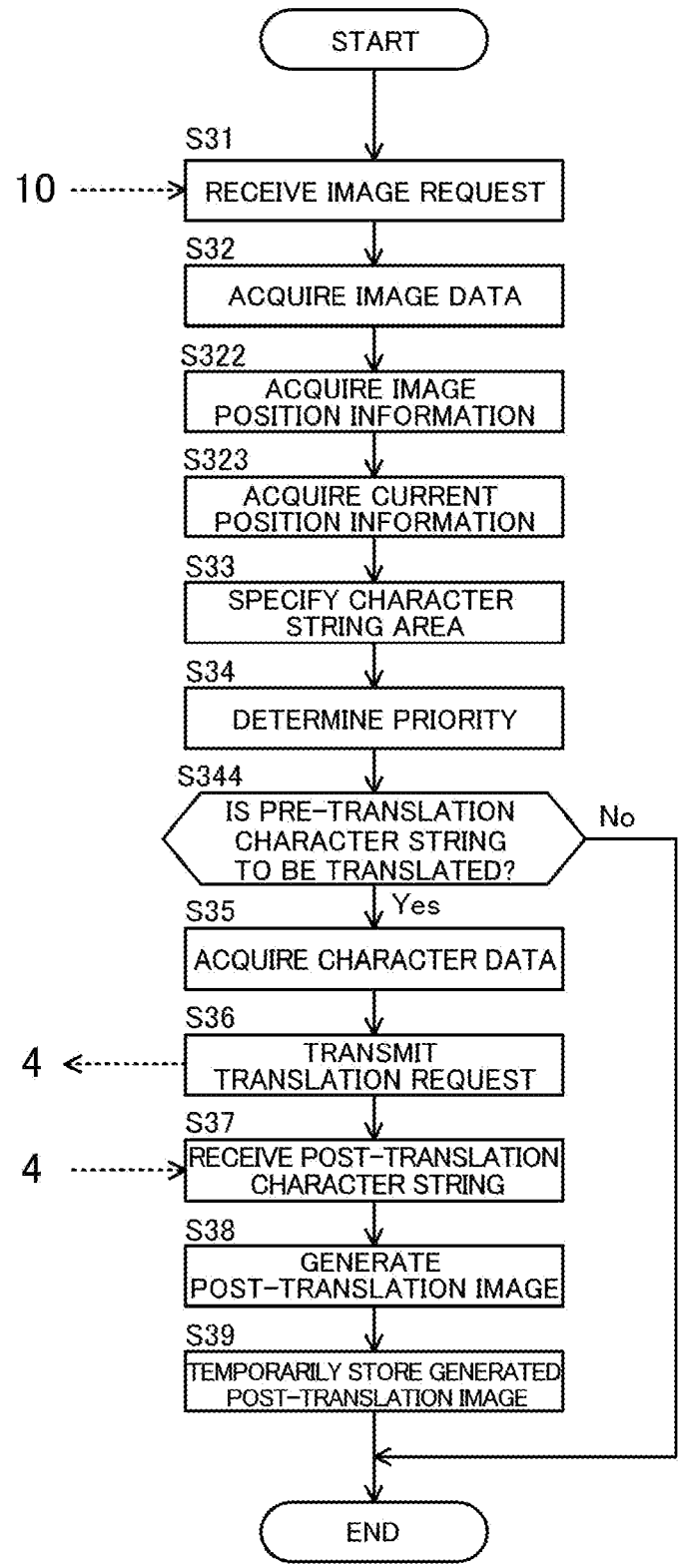
FIG. 11 is a diagram for illustrating an example of a processing flow by the image server.

FIG. 11 is a diagram for illustrating an example of a processing flow by the image server 3. In the description of the third processing example, steps that are similar to those in the first processing example and the second processing example are denoted using the same step number, and a detailed description thereof is omitted in part.

Figure 12B:
FIG. 12B is a diagram for showing an example of a page including a post-translation image after partial translation.

FIG. 12A is a diagram for showing an example of the pre-translation page 6 including a plurality of pre-translation images 170, 270, and 370 to be processed in this example. The first pre-translation image 170 and the second pre-translation image 270 are the same as in the second processing example. A third pre-translation image 370 is, for example, an image in which a background image 371 and a pre-translation character string 372 are integrated. The pre-translation character string 372 is, for example, a character string in Japanese saying "買い物かご" ("Shopping Cart"). The third pre-translation image 370 is arranged at an upper portion of the pre-translation page 6. Further, FIG. 12B is a diagram for showing an example of the post-translation page 8A after partial translation, and FIG. 12C is a diagram for showing an example of the post-translation page 8B after full translation.

Further, in this example, the pre-translation page 6 is long in the length direction, which prevents all of the pre-translation page 6 from being displayed on the display screen of the user terminal 10. As a result, the user needs to scroll a display range. The dotted line shown in FIG. 12A indicates a current display range 100 of the user terminal 10. In other words, in the state shown in FIG. 12A, the pre-translation character string 61 and the pre-translation images 170 and 370 that are in the display area 100 are displayed on the user terminal 10, but the pre-translation image 270 that is not in the display area 100 is not displayed on the user terminal 10.

The user terminal 10 transmits an image request for the pre-translation images 170, 270, and 370 in accordance with a predetermined order, and repeats this process until translation of all of the pre-translation images is completed. The image server 3 executes the processing illustrated in FIG. 11 each time an image request is received. In the following example, the image server 3 first receives an image request for the first pre-translation image 170, next receives an image request for the second pre-translation image 270, and then receives an image request for the third pre-translation image 370.

In Step S31, the image server 3 receives an image request for the first pre-translation image 170 from the user terminal 10. The image request includes location information representing the location of the first pre-translation image 170 and language designation information.

In Step S32, the image server 3 acquires the first pre-translation image 170 specified by the received image request from the image database (not shown).

In Step S322, the image server 3 acquires image position information representing the position of the first pre-translation image 170 in the pre-translation page 6. For example, the image server 3 may acquire the image position information by acquiring page data from the user terminal 10, the web server 2, or the translation server 4, and analyzing the acquired page data. Alternatively, the image position information may be added to the image request transmitted from the user terminal 10 in Step S31.

In Step S323, the image server 3 acquires from the user terminal 10 current position information representing the position of the current display area 100 of the user terminal 10.

In Step S33, the image server 3 specifies a character string area of the first pre-translation character string 172 in the first pre-translation image 170.

In Step S34, the image server 3 determines the translation priority of the first pre-translation character string 172. The image server 3 determines the translation priority based on the position of the current display area 100 of the user terminal 10, for example.

When determining the priority, a higher priority is assigned to, for example, the pre-translation character string of the pre-translation image included in the display area 100 or to the pre-translation character string of the pre-translation image closer to the display.

For the pre-translation page 6 in this example, the first pre-translation image 170 is positioned in the display area 100, and hence the first priority is assigned to the first pre-translation character string 172 added to the first pre-translation image 170.

In Step S344, based on the priority, the image server 3 determines whether or not the first pre-translation character string 172 is to be translated. In this example, because the first priority is assigned to the first pre-translation character string 172, the image server 3 determines that the first pre-translation character string 172 is to be translated (S344: Yes).

In Step S35, the image server 3 acquires the character data representing the first pre-translation character string 172 from the first pre-translation image 170.

In Step S36, the image server 3 transmits a translation request including the acquired character data representing the first pre-translation character string 72 and the language designation information to the translation server 4.

In Step S37, the image server 3 receives the character data of the first post-translation character string 192 corresponding to the first pre-translation character string 172 translated by the translation server 4. The first post-translation character string 192 is, for example, a character string in English saying "Super Sale".

In Step S38, the image server 3 generates the first post-translation image 190 so that the first post-translation character string 192 is represented. Specifically, the image server combines the character image representing the first post-translation character string 192 with the first pre-translation image 170. As a result, a first post-translation image 190 such as that shown in FIG. 12B is generated.

In Step S39, the image server 3 temporarily stores the generated first post-translation image 190 in the database (not shown). The first post-translation image 190 stored in this case includes a finish notification indicating that translation has been completed. Next, the processing returns to Step S31, and the image server 3 receives an image request for the second pre-translation image 270 from the user terminal 10. The image request includes location information representing the location of the second pre-translation image 270 and language designation information.

In Step S32, the image server 3 acquires the second pre-translation image 270 specified by the received image request from the image database (not shown).

In Step S322, the image server 3 acquires image position information representing the position of the second pre-translation image 270 in the pre-translation page 6.

In Step S323, the image server 3 acquires from the user terminal 10 current position information representing the position of the current display area 100 of the user terminal 10.

In Step S33, the image server 3 specifies a character string area of the second pre-translation character string 272 in the second pre-translation image 270.

In Step S34, the image server 3 determines the translation priority of the second pre-translation character string 272. The image server 3 determines the translation priority based on the position of the current display area 100 of the user terminal 10, for example.

For the pre-translation page 6 in this example, the second pre-translation image 270 is positioned outside the display area 100, and hence the second priority is assigned to the second pre-translation character string 272 added to the second pre-translation image 270.

In Step S344, based on the priority, the image server 3 determines whether or not the second pre-translation character string 272 is to be translated. In this example, because the second priority is assigned to the second pre-translation character string 272, the image server 3 determines that the second pre-translation character string 272 is not to be translated (S344: No).

Next, the processing returns to Step S31, and the image server 3 receives an image request for the third pre-translation image 370 from the user terminal 10. The image request includes location information representing the location of the third pre-translation image 370 and language designation information.

In Step S32, the image server 3 acquires the third pre-translation image 370, specified by the received image request from the image database (not shown).

In Step S322, the image server 3 acquires image position information representing the position of the third pre-translation image 370 in the pre-translation page 6.

In Step S323, the image server 3 acquires from the user terminal 10 current position information representing the position of the current display area 100 of the user terminal 10.

In Step S33, the image server 3 specifies a character string area of the third pre-translation character string 372 in the third pre-translation image 370.

In Step S34, the image server 3 determines the translation priority of the third pre-translation character string 372. The image server 3 determines the translation priority based on the position of the current display area 100 of the user terminal 10, for example.

For the pre-translation page 6 in this example, the third pre-translation image 370 is positioned in the display area 100, and hence the first priority is also assigned to the third pre-translation character string 372 added to the third pre-translation image 370.

In Step S344, based on the priority, the image server 3 determines whether or not the third pre-translation character string 372 is to be translated. In this example, because the first priority is also assigned to the third pre-translation character string 372, the image server 3 determines that the third pre-translation character string 372 is to be translated (S344: Yes).

In Step S35, the image server 3 acquires the character data representing the third pre-translation character string 372 from the third pre-translation image 370.

In Step S36, the image server 3 transmits a translation request including the acquired character data representing the third pre-translation character string 372 and the language designation information to the translation server 4.

In Step S37, the image server 3 receives the character data of the third post-translation character string 392 corresponding to the third pre-translation character string 372 translated by the translation server 4. The third post-translation character string 392 is, for example, a character string in English saying "Shopping Cart".

In Step S38, the image server 3 generates the third post-translation image 390 so that the third post-translation character string 392 is represented. Specifically, the image server combines the character image representing the third post-translation character string 392 with the third pre-translation image 370. As a result, a third post-translation image 390 such as that shown in FIG. 12B is generated.

In Step S39, the image server 3 temporarily stores the generated third post-translation image 390 in the database (not shown). The third post-translation image 390 stored in this case includes a finish notification indicating that translation has been completed.

At the point when the first round of processing has been completed, the user terminal 10 is capable of acquiring the translated first post-translation image 190 as a response to an image request for the first pre-translation image 170, the non-translated second pre-translation image 270 as a response to an image request for the second pre-translation image 270, and the translated third post-translation image 390 as a response to an image request for the first pre-translation image 370. In this case, a post-translation page 8A after partial translation such as that shown in FIG. 12B is displayed. In other words, in the post-translation page 8A after partial translation, only the first pre-translation image 170 and the third pre-translation image 370 have been replaced with the first post-translation image 190 and the third post-translation image 390, respectively, and the second pre-translation image 270 has not been translated and remains as is.

In addition, the image server 3 receives from the user terminal 10 an image request for a second round of processing. At this point, the user terminal 10 may skip transmission of an image request for the first pre-translation image 170 and the third pre-translation image 370 for which translation is already complete. In this case, the image server 3 receives an image request for the second pre-translation image 270.

In Steps S32 to S34, in the same manner as described above, the image server 3 acquires the second pre-translation image 270, image position information, and current position information, specifies the character string area of the second pre-translation character string 272, and determines the translation priority. In this case, when the image server 3 holds information on the priority determined in the first round of processing, Steps S32 to S34 may be omitted.

The image server 3 determines whether or not the second pre-translation character string 272 is to be translated based on the priority. In this example, because translation of the first priority is already complete, the translation target is the second pre-translation character string 272 to which the second priority has been assigned (S344: Yes).

In Step S35, the image server 3 acquires the character data representing the second pre-translation character string 272 from the second pre-translation image 270.

In Step S36, the image server 3 transmits a translation request including the acquired character data representing the second pre-translation character string 272 and the language designation information to the translation server 4.

In Step S37, the image server 3 receives the character data of the second post-translation character string 292 corresponding to the second pre-translation character string 272 translated by the translation server 4. The second post-translation character string 292 is, for example, a character string in English saying "Would you like to open your shop?"

In Step S38, the image server 3 generates the second post-translation image 290 so that the second post-translation character string 292 is represented. Specifically, the image server combines the character image representing the second post-translation character string 292 with the second pre-translation image 270. As a result, a second post-translation image 290 such as that shown in FIG. 12C is generated.

In Step S39, the image server 3 temporarily stores the generated second post-translation image 290 in the database (not shown). The second post-translation image 290 stored in this case includes a finish notification indicating that translation has been completed.

At the point when the second round of processing has been completed, the user terminal 10 is capable of acquiring the translated second post-translation image 290 as a response to an image request for the second pre-translation image 270. In this case, a post-translation page 8B after full translation such as that shown in FIG. 12C is displayed. In other words, in the post-translation page 8B after full translation, all of the pre-translation images 170, 270, and 370 have respectively been replaced with the post-translation images 190, 290, and 390.

Further, when the user terminal 10 detects a finish notification of all of the post-translation images 190, 290, and 390, the user terminal 10 stops transmitting image requests.

Note that, in this example, the user terminal 10 transmits an image request for the pre-translation images 170, 270, and 370 in accordance with a predetermined order. However, the present invention is not limited to this mode. The order for transmitting the image requests for the pre-translation images 170, 270, and 370 by the image server 3 may be determined based on a priority, and designated in the user terminal 10.

While the embodiment of the present invention has been described above, it is to be understood that the present invention is not limited to the embodiment described above and may be subjected to various modifications by a person skilled in the art.

For example, when determining the translation priority, two or three among the determination methods for the priority described in the first processing example, the second processing example, and the third processing example may be suitably combined.

The invention claimed is:

1. An information processing system, comprising:
   acquisition means for acquiring a plurality of converted character strings one by one, each of the plurality, of converted character strings having been convened from a corresponding one of a plurality of original character strings, each of the plurality of original character strings being included in at least any one of one or more original images;
   generation means for generating, each time one of the plurality of converted character strings is acquired, a converted image in which the acquired converted character string is arranged in an area corresponding to a display area of the original character string corresponding to the acquired converted character string in the original image including the original character string; and
   changing means for changing, on a display device displaying at least a part of an object including one or more images on a screen based on display information, the original image corresponding to the converted image generated by the generation means in the object to the converted image,
   wherein the acquisition means acquires the plurality of converted character strings one by one, each of the plurality of converted character strings corresponding to one of the plurality of original character strings, in accordance with an order that is based on priorities of the plurality of original character strings.

2. The information processing system according to claim 1, wherein the priority is set by setting means based on at least any one of a display mode of the original character string and an arrangement position of the image including the original character string in the object.

3. The information processing system according to claim 1, wherein the priority is set by setting means based on a visual characteristic amount of the original character string in the object displayed based on the display information.

4. The information processing system according to claim 2, further comprising the setting means.

5. The information processing system according to claim 4, further comprising:
receiving means for receiving an acquisition request for any one of the images arranged in the foreground in the object from the display device, the display device transmitting the acquisition request at a predetermined timing for each image,
wherein the changing means changes, each time the acquisition request is received, the content of the foreground of the arrangement area of the image corresponding to the acquisition request in the object to a converted image, which is generated by the generation means and includes more convened character strings to be arranged than the image arranged in the foreground of the arrangement area.

6. The information processing system, according to claim 5, further comprising:
range information acquisition means for acquiring range information indicating a range in which the object is being displayed on the screen from the display device at a predetermined timing,
wherein the setting means decreases the priority of an original character string not included in the range indicated by the range information by at least one level.

7. The information processing system according to claim 2, further comprising:
receiving means for receiving an acquisition request for any one of the images arranged in the foreground in the object from the display device, the display device transmitting an acquisition request for the image corresponding to the original character string at a predetermined timing in accordance with an order that is based on the priority set by the setting means,
wherein the changing means changes, each time the acquisition request is received, the content of the foreground of the arrangement area of the image corresponding to the acquisition request in the object to a converted image, which is generated by the generation means and includes more converted character strings to be arranged than the image arranged in the foreground of the arrangement area.

8. The information processing system according to claim 1, wherein the changing means incrementally changes the content of the foreground of the arrangement area of the original image, wherein the original image corresponds to the generated converted image in the object to the converted image.

9. A method executed by an image server which comprises a central processing unit, a storage unit and communication interface unit, the method comprising:
acquiring a plurality of converted character strings one by one, each of the plurality of converted character strings having been converted from a corresponding one of a plurality of original character strings, each of the plurality of original character strings being included in at least any one of one or more original images;
generating, each time one of the plurality of converted character strings is acquired, a converted image in which the acquired converted character string is arranged in an area corresponding to a display area of the original character string corresponding to the acquired converted character string in the original image including the original character string; and
changing, on a display device displaying at least a part of an object including one or more images on a screen based on display information, the original image corresponding to the converted image generated by the generation means in the object to the converted image,
wherein the acquiring step comprises acquiring the plurality of converted character strings one by one, each of the plurality of converted character strings corresponding to one of the plurality of original character strings, in accordance with an order that is based on priorities of the plurality of original character strings.

10. A non-transitory computer-readable information storage medium having recorded thereon a program for causing a computer, which comprises a central processing unit, a storage unit and communication interface unit, to function as:
acquisition means for acquiring a plurality of converted character strings one by one, each of the plurality of converted character strings having been converted from a corresponding one of a plurality of original character strings, each of the plurality of original character strings being included in at least any one of one or more original images;
generation means for generating, each time one of the plurality of converted character strings is acquired, a converted image in which the acquired converted character string is arranged in an area corresponding to a display area of the original character string corresponding to the acquired converted character string in the original image including the original character string; and
changing means for changing, on a display device displaying at least a part of an object including one or more images on a screen based on display information, the original image corresponding to the converted image generated by the generation means in the object to the converted image,
wherein the acquisition means acquires the plurality of converted character strings one by one, each of the plurality of converted character strings corresponding to one of the plurality of original character strings, in accordance with an order that is based on priorities of the plurality of original character strings.

* * * * *